United States Patent [19]

Lusher et al.

[11] Patent Number: 5,708,573
[45] Date of Patent: Jan. 13, 1998

[54] VARACTOR CONTROLLED FIXED FREQUENCY VHF DC-DC CONVERTER

[75] Inventors: David M. Lusher; Wilbur E. Hong, both of Torrance; William B. Hwang, Los Angeles, all of Calif.

[73] Assignee: Hughes Electronics, Los Angeles, Calif.

[21] Appl. No.: 593,164

[22] Filed: Feb. 1, 1996

[51] Int. Cl.$^6$ .................. H02M 3/22; G05F 1/46
[52] U.S. Cl. .................. 363/47; 333/222; 333/32
[58] Field of Search .................. 323/222, 224; 363/39, 44, 45, 46, 47, 48; 333/32, 17.1, 174

[56] References Cited

U.S. PATENT DOCUMENTS

| | | | |
|---|---|---|---|
| 3,571,697 | 3/1971 | Phillips | 323/22 |
| 4,048,598 | 9/1977 | Knight | 333/32 |
| 4,459,537 | 7/1984 | McWhorter | 323/224 |
| 5,097,196 | 3/1992 | Schoneman | 323/222 |
| 5,107,233 | 4/1992 | Stoft | 333/168 |
| 5,343,172 | 8/1994 | Utsu et al. | 333/32 |
| 5,392,011 | 2/1995 | Li | 333/174 |
| 5,432,431 | 7/1995 | Vinciarelli et al. | 323/222 |
| 5,574,413 | 11/1996 | Ruelke | 333/174 |

Primary Examiner—Peter S. Wong
Assistant Examiner—Derek J. Jardieu
Attorney, Agent, or Firm—Leonard A. Alkov; Wanda K. Denson-Low

[57] ABSTRACT

A DC to DC converter including a resonant switching circuit (13, 51, 115, 151, 125, 153); an impedance matching circuit (53) responsive to the resonant switching circuit; a rectifier circuit (55) responsive to the impedance matching circuit; an output filter circuit (57) responsive to rectifier circuit for providing a filtered DC to DC converter voltage output; and a varactor diode circuit (27, 29, 31, 61) responsive to the filtered DC to DC converter voltage output for controlling the impedance matching circuit such that the filtered DC to DC converter output voltage is substantially constant.

5 Claims, 2 Drawing Sheets

VARACTOR CONTROLLED FIXED FREQUENCY VHF DC-DC CONVERTER

BACKGROUND OF THE INVENTION

The disclosed invention is generally directed to DC-DC converters, and more particularly to a VHF DC-DC converter that utilizes a varactor diode as an output regulation element.

DC to DC converters are utilized in applications wherein the output of a source DC voltage needs to be converted to a DC supply voltage of a different voltage level. Typically, the source DC voltage is converted to an AC voltage by some form of switching circuitry. The AC voltage is stepped up or down as required, and then rectified to provide the DC supply voltage. DC to DC converters have been designed to operate in the VHF range of frequencies since higher frequencies allow for significantly smaller passive components and also provide for faster feedback response to load perturbations.

A known technique used for regulation of fixed frequency VHF DC-DC converters is control of the drive level to the power switch or switches. Such technique, however, is inadequate for wide variations in input line voltage, and although it provides for regulation against load variations, high efficiency could not be maintained under these conditions, since a switch requires a certain minimum level of drive to behave as a switch. Over a small variation in load, reducing the switch drive amplitude has the effect of reducing the switch effective duty (i.e., the on time of the switch). The switch would still reach a saturated state, but not for as long, which is analogous to reducing the duty in a pulse width modulated power supply. If the drive amplitude is decreased beyond a certain minimum level, which depends on the characteristics of the transistor switch used, the transistor switch would not reach saturation and would operate in its linear region. Under these conditions, even when the transistor switch is nominally on, the collector-emitter voltage would be high, with a corresponding high conduction loss. With known transistors, this effect of changing from a switching behavior to a linear behavior occurs at a drive level very close to the nominal "full load" level. Thus, at loads only slightly less than full load, the transistor would cease to behave as a switch, thereby exhibiting high power dissipation that would rapidly degrade power supply efficiency.

SUMMARY OF THE INVENTION

It would therefore be an advantage to provide a VHF DC to DC converter that maintains a substantially constant output power over a wide range of input voltage variations.

Another advantage would be to provide a VHF DC to DC converter having good efficiency over a wide range of input voltage and load variations.

The foregoing and other advantages are provided by the invention in a DC to DC converter that includes a resonant switching circuit; an impedance matching circuit responsive to the resonant switching circuit; a rectifier circuit responsive to the impedance matching circuit; an output filter circuit responsive to rectifier circuit for providing a filtered DC to DC converter voltage output; and a varactor diode circuit responsive to the filtered DC to DC converter voltage output for controlling the impedance matching circuit such that the filtered DC to DC converter output voltage is substantially constant.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
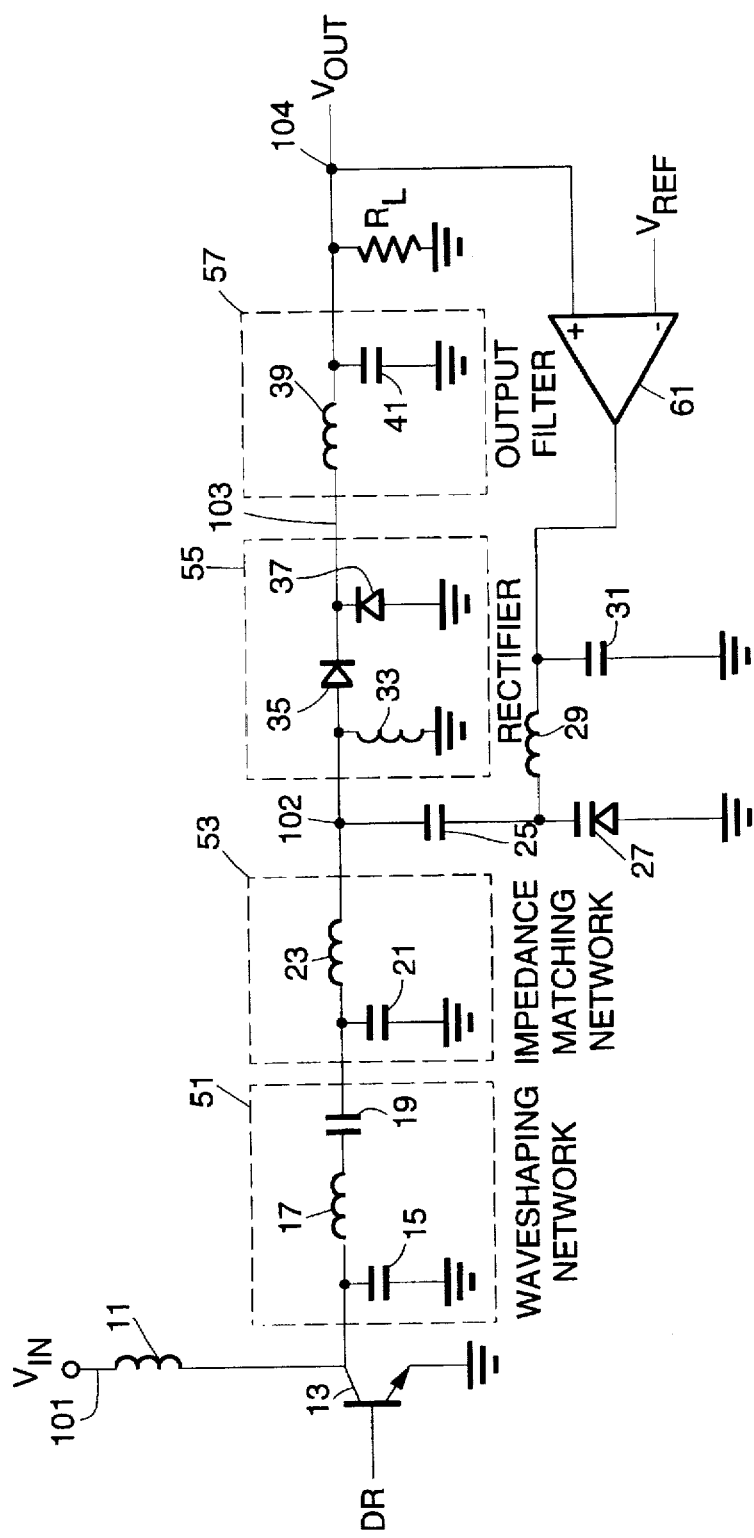
FIG. 1 is a schematic circuit diagram of a DC to DC converter in accordance with the invention.

In the following detailed description and in the several figures of the drawing, like elements are identified with like reference numerals.

Referring now to FIG. 1, set forth therein is a schematic diagram of a VHF DC to DC inverter in accordance with the invention which includes an RF choke 11 having one terminal connected to a first supply node 101 which is connected to a supply voltage $V_{IN}$ that is positive relative to a ground reference. The other terminal of the RF choke 11 is connected to the collector terminal of an NPN transistor 13 at a node 101. The emitter terminal of the NPN transistor 13 is connected to a ground reference potential, while the base of the NPN transistor 13 is driven with a periodic drive voltage signal DR which has a predetermined frequency $F_0$. By way of illustrative example, the periodic drive voltage signal DR comprises a sinusoid.

A capacitor 15 is connected between the collector of the NPN transistor 13 and the ground, and an inductor 17 is connected between the collector of the NPN transistor and one terminal of a capacitor 19. The other terminal of the capacitor 19 is connected to one terminal of a capacitor 21 and one terminal of an inductor 23, at a node 102. The other terminal of the capacitor 21 is connected to ground while the other terminal of the inductor 23 to one terminal of a blocking capacitor 25. The other terminal of the blocking capacitor 25 is connected to the cathode of a varactor diode 27 which has its anode connected to ground. An inductor 29 is connected between the cathode of the varactor diode 27 and one terminal of a capacitor 31 which has its other terminal connected to ground. The output of an error amplifier 61 is connected to the node between the inductor 29 and the capacitor 31.

One terminal of an inductor 33 and the anode of a diode 35 is connected to the node 102. The other terminal of the inductor 33 is connected to ground, while the cathode of the diode 35 is connected to a node 103. A diode 37 has its cathode connected to the node 103 and its anode connected to ground. An inductor 39 is connected between the node 103 and an output node 104. A capacitor 41 and a load resistor $R_L$ are connected in parallel between the output node 104 and ground. The voltage $V_{OUT}$ across the load resistor $R_L$ comprises the output of the DC to DC converter. The inductor 33 and the diodes 35, 37 form a rectifier circuit 55, while the inductor 39 and the capacitor 41 form an output filter 57.

The non-inverting input of the error amplifier 61 is connected to the output node 104, while the inverting input of the error amplifier 61 is connected to a reference voltage $V_{REF}$. Thus, the output of the error amplifier 61 varies with the output voltage $V_{OUT}$.

In operation, the RF choke 11 provides an approximately constant current that is chopped by the NPN transistor 13. The capacitor 15, the inductor 17 and the capacitor 19 form a resonant waveshaping network 51 that ensures that the collector-emitter voltage of the NPN transistor 13 is zero when it turns on, and that the collector-emitter voltage of the NPN transistor 13 rises slowly in a resonant manner when the NPN transistor 13 turns off, giving the transistor current time to fall to zero before appreciable switch voltage builds up, thereby virtually eliminating switching losses. In particular, the resonant circuit is designed such that the collector voltage rises relatively slowly when the transistor turns off. For a sinusoidal drive signal DR having a period T, when the drive signal DR goes positive at the start of a period T, the collector current of the transistor 13 rises and peaks after the T/4, starts to decrease prior to T/2, and reaches zero a short time after T/2. When the drive signal DR goes negative at T/2, the collector voltage rises slowly due to the capacitor 15, such that the collector current decreases to zero before the collector voltage has risen very far.

By way of illustrative example, the frequency $F_0$ of the periodic drive voltage signal DR can be in the range of 30 MHz to 200 MHz, and the resonant waveshaping network 51 is tuned to a resonant frequency in the range of about $0.8F_0$ to about $0.9F_0$.

The capacitor 15 and the inductor 17 form an impedance matching network 53 that is tuned to a resonant frequency that is equal to the drive frequency $F_0$ at a nominal load impedance, and transforms the input impedance of the rectifier circuit 55 to an impedance which is optimum for proper operation of the Class E resonant inverter formed by the NPN transistor 15 and the resonant waveshaping network 51. The voltage at the node 102 comprises a sinusoid that is symmetrical about the ground reference potential and has a frequency equal to the drive frequency $F_0$. The varactor 27, the inductor 29, capacitor 31, and the error amplifier 61 form a variable capacitance circuit that mistunes the impedance matching network 53 to maintain the output voltage $V_{OUT}$ at the output node 104 of the converter at a substantially constant level as determined by the value of the reference voltage $V_{REF}$ provided to the error amplifier 61. Additionally, the error amplifier 61 maintains a DC voltage across the varactor 27 that at all times is equal to or greater than the amplitude of the sinusoidal voltage at the node 102. This insures that the varactor 27 is continuously reverse biased.

More particularly as to the varactor diode 27, the DC bias thereof as provided by the output of the error amplifier 61 varies with changes in the output voltage $V_{OUT}$. The capacitance provided by the varactor diode 27 changes inversely with changes in the DC bias applied thereto, and the impedance matching network 53 is configured to restore the output voltage $V_{OUT}$ to be substantially equal to the reference voltage $V_{REF}$ pursuant to change in the capacitance provided by the varactor diode 27. By way of illustrative example, the impedance matching network 53 causes the output voltage $V_{OUT}$ to decrease when the output voltage increases above the reference voltage $V_{REF}$ and to increase when the output voltage decreases below the reference voltage $V_{REF}$. Thus, if the output voltage $V_{OUT}$ increases above the reference voltage $V_{REF}$, for example due to a change in load or an increase in $V_{IN}$, the output of the error amplifier increases and the capacitance of the varactor diode 27 decreases. This mistunes the impedance matching network 53 in such a manner that causes the output voltage $V_{OUT}$ to decrease. If the output voltage $V_{OUT}$ decreases below the reference voltage $V_{REF}$, the output of the error amplifier decreases and the capacitance of the varactor diode 27 increases. This mistunes the impedance matching network 53 in such a manner that causes the output voltage $V_{OUT}$ to increase.

Figure 2:
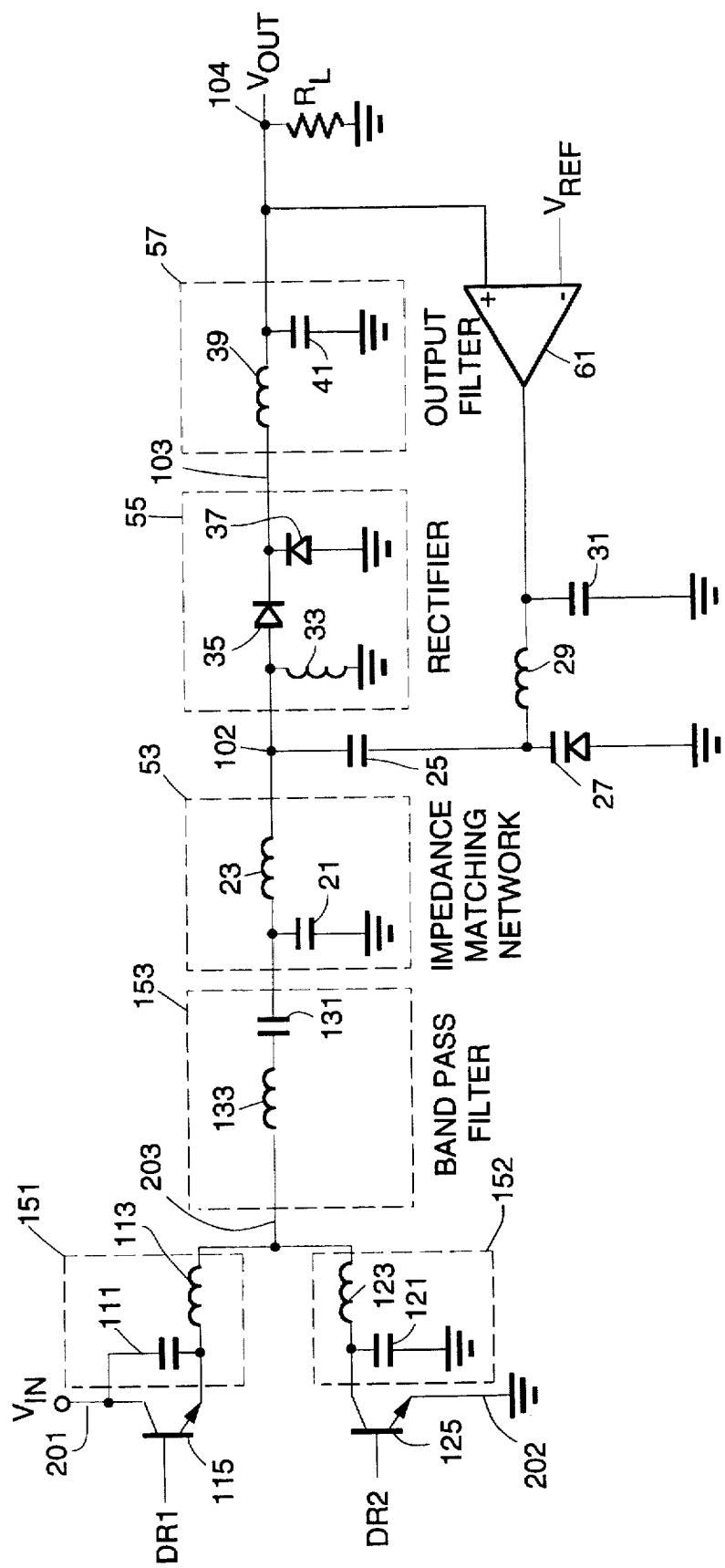
FIG. 2 is a schematic diagram of a series resonant half bridge VHF DC to DC inverter in accordance with the invention.

Referring now to FIG. 2, set forth therein is a schematic diagram of a series resonant half bridge VHF DC to DC inverter in accordance with the invention which includes a first capacitor 111 having one terminal connected to a first supply node 201 which is connected to a supply voltage $V_{IN}$ that is positive relative to a ground reference. The other terminal of the first capacitor 111 is connected to one terminal of a first inductor 113 which has its other terminal connected to a central node 203. The collector terminal of a first NPN transistor 115 is connected to the first supply node 201, while the emitter of the first NPN transistor 115 is connected to the node between the first capacitor 111 and the first inductor 113. The base of the first NPN transistor 115 is driven with a first periodic drive voltage signal DR1 which has a predetermined frequency.

The first NPN transistor 115 comprises an active switch that provides an open circuit when it is open or non-conductive, and electrically connects the two terminals of the first capacitor 111 when it is conductive. The first capacitor 111 and the first inductor 113 comprise a first resonant circuit 151 that is configured to have a close to zero voltage across the first capacitor 111 when the NPN transistor 115 turns on.

The DC to AC inverter of FIG. 2 further includes a second capacitor 121 having one terminal connected to a second supply node 202 which is connected to the ground reference potential. The other terminal of the second capacitor 121 is connected to one terminal of a second inductor 123 which has its other terminal connected to the central node 203. The collector terminal of a second NPN transistor 125 is connected to the node between the second capacitor 121 and the second inductor 123, while the emitter of the second NPN transistor 125 is connected to the second supply node 202. The base of the second NPN transistor 125 is driven with a second periodic drive voltage signal DR2 which is of the same predetermined frequency as the first periodic drive voltage signal DR1, but is 180 degrees out of phase with respect to the first periodic drive voltage signal DR1.

The second NPN transistor 125 comprises an active switch that provides an open circuit when it is open or non-conductive, and electrically connects the two terminals of the second capacitor 121 when it is conductive. The second capacitor 121 and the second inductor 123 comprise a second resonant circuit 152 that is particularly configured to have a close to zero voltage across the second capacitor 121 when the second NPN transistor 125 turns on.

More particularly as to the drive signals DR1, DR2, the first and second inductors 113, 123 in the first and second resonant circuits 151, 152 prevent rapid buildup of current, which allows the transistors 115, 125 to be advantageously driven with a 50 percent duty cycle. Thus, the first and second periodic drive voltage signals DR1, DR2 can comprise sinusoids which are easily produced in the VHF range. By way of illustrative example, the frequency of the periodic drive voltage signals DR1, DR2 is in the range of 30 MHz to 200 MHz. Since the transistors 115, 125 can be driven with a 50 percent duty, the first and second resonant circuits can be tuned for example to a resonant frequency that is in the range of $0.75F_0$ to $1.1F_0$, wherein $F_0$ is the frequency of the periodic drive voltage signals DR1, DR2 and thus the operating frequency of the converter of FIG. 2. Since the resonant frequency of the first and second resonant circuits is close to the frequency of the periodic drive voltage signals DR1, DR2, the collector-emitter capacitances of the first and second NPN transistors 115, 125 are readily utilized with external capacitances to form the first and second capacitors 111, 121 of the resonant circuits.

A third inductor 133 and a third capacitor 131 are serially connected between the central node 203 and a node 102. The third inductor 133 and the third capacitor 131 form a bandpass filter 153 that is tuned to a resonant frequency that is equal to the frequency $F_0$ of the periodic drive voltage signals DR1, DR2.

In operation, the first and second NPN transistors 115, 125 alternatingly turn on and off, the first resonant circuit 151 comprised of the first capacitor 111 and the first inductor 113 resonates such that the voltage across the first capacitor 111 rings to close to zero when the first NPN transistor 115 turns on; and the second resonant circuit 151 comprised of the second capacitor 121 and the second inductor 123 resonates such that the voltage across the second capacitor 121 rings close to zero when the second NPN transistor 125 turns on. Thus, when first periodic drive voltage signal DR1 makes a positive zero crossing and the second periodic drive voltage signal makes a negative zero crossing, the first NPN transistor 15 turns on and the second NPN transistor turns off. The voltage at the collector of the second NPN transistor 25 increases from ground potential to a maximum, and then decreases so as to reach ground potential as the second periodic drive voltage signal DR2 makes a positive zero crossing. Analogously, when the first periodic drive voltage signal DR1 makes a negative zero crossing and the second periodic drive voltage signal DR2 makes a positive zero crossing, the first NPN transistor 115 turns off and the second NPN transistor 125 turns on. The voltage at the emitter of the first NPN transistor 15 decreases from $V_{IN}$ to a minimum, and then increases so as to reach $V_{IN}$ as the first periodic drive voltage signal DR1 makes a positive zero crossing.

The remaining elements of the converter of FIG. 2 include an impedance matching network 53, a rectifier circuit 55, and output filter 57, a load resistor $R_L$, and a variable capacitance circuit comprised of a varactor 27, an inductor 29, a capacitor 31, and an error amplifier 61, which are substantially similar to corresponding elements in the converter of FIG. 1 and function similarly to the corresponding elements in FIG. 1.

The foregoing has been a disclosure of a VHF DC to DC converter that maintains a substantially constant output power over a wide range of input voltage variations and has good efficiency over a wide range of input voltage and load variations.

Although the foregoing has been a description and illustration of specific embodiments of the invention, various modifications and changes thereto can be made by persons skilled in the art without departing from the scope and spirit of the invention as defined by the following claims.

What is claimed is:

1. A VHF DC to DC converter comprising:

resonant switching means connected between a supply voltage and ground, said switching means being driven with a periodic drive signal of a predetermined drive frequency;

an impedance matching circuit responsive to said resonant switching means;

rectifying means responsive to said impedance matching circuit;

filtering means responsive to said rectifying meas for providing a filtered DC to DC converter voltage output; and a varactor diode circuit responsive to said filtered DC to DC converter voltage output for controlling said impedance matching circuit such that said filtered DC to DC converter output voltage is substantially constant.

2. The DC to DC converter of claim 1 wherein said drive signal comprises a sinusoid.

3. The DC to DC converter of claim 1 wherein said resonant switching means includes a transistor and a resonant circuit.

4. The DC to DC converter of claim 1 wherein said bandpass filtering means is tuned to said predetermined drive frequency.

5. The DC to DC converter of claim 2 wherein said varactor diode circuit includes amplifier means responsive to said filtered DC to DC converter voltage output, a low pass filter responsive to said amplifier means, and a varactor diode responsive to said low pass filter.

* * * * *